United States Patent
Kasasaku

(10) Patent No.: US 7,340,413 B2
(45) Date of Patent: Mar. 4, 2008

(54) TRANSACTION TERMINAL APPARATUS

(75) Inventor: Takami Kasasaku, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 456 days.

(21) Appl. No.: 10/102,866

(22) Filed: Mar. 22, 2002

(65) Prior Publication Data
US 2003/0004812 A1    Jan. 2, 2003

(30) Foreign Application Priority Data
Jun. 27, 2001    (JP)    ............... 2001-195275

(51) Int. Cl.
G06Q 20/00    (2006.01)
(52) U.S. Cl. ...................................... 705/21
(58) Field of Classification Search ............... 705/21, 705/16, 17, 18, 27, 26, 20, 24, 64, 67, 73, 705/75
See application file for complete search history.

(56) References Cited

U.S. PATENT DOCUMENTS

| | | | | |
|---|---|---|---|---|
| 5,195,133 A * | 3/1993 | Kapp et al. | ................... | 705/75 |
| 5,285,506 A * | 2/1994 | Crooks et al. | ............... | 382/189 |
| 6,332,133 B1* | 12/2001 | Takayama | ................... | 705/39 |
| 6,539,363 B1* | 3/2003 | Allgeier et al. | ............... | 705/39 |
| 2002/0120582 A1* | 8/2002 | Elston et al. | ................. | 705/64 |
| 2002/0128981 A1* | 9/2002 | Kawan et al. | ................. | 705/67 |
| 2002/0194121 A1* | 12/2002 | Takayama | ..................... | 705/39 |
| 2002/0194137 A1* | 12/2002 | Park et al. | ..................... | 705/64 |
| 2003/0121966 A1* | 7/2003 | George et al. | ............... | 235/375 |
| 2003/0140007 A1* | 7/2003 | Kramer et al. | ................. | 705/40 |
| 2006/0173790 A1* | 8/2006 | Park et al. | ..................... | 705/64 |
| 2006/0200681 A1* | 9/2006 | Kato et al. | ................... | 713/193 |
| 2007/0061256 A1* | 3/2007 | Park et al. | ..................... | 705/40 |

FOREIGN PATENT DOCUMENTS

| | | |
|---|---|---|
| JP | 2-148275 | 6/1990 |
| JP | 7-93406 | 4/1995 |
| JP | 10-320465 | 4/1998 |
| JP | 10-320465 | 12/1998 |

* cited by examiner

Primary Examiner—Ronald Laneau
(74) Attorney, Agent, or Firm—Staas & Halsey LLP

(57) ABSTRACT

The present invention is provided with an entry unit for entering a customer's signature on the display unit of the transaction terminal apparatus for executing a transaction with a client. The entered signature is then displayed on the display unit. By having the customer thus sign on the display unit after the shop assistant has taken a transaction medium (such as a credit card) from the customer and had the card information (information for settlement, including card number) read, the shop assistant can quickly match the signatures and then return the transaction medium to the customer. This enables the unease felt by a customer when a shop assistant has taken charge of a transaction medium for a relatively long time to be eliminated.

7 Claims, 5 Drawing Sheets

FIG. 4A

SCAN THE PRODUCT.

PURCHASED PRODUCT
LIQUID CRYSTAL
TELEVISION
120,000 YEN
(INCLUDING TAX)
LIQUID CRYSTAL
TELEVISION ADAPTER
8,000 YEN
(INCLUDING TAX)

SUBTOTAL 128,000 YEN

TOTAL

FIG. 4B

TOTAL PURCHASE PRICE 128,000 YEN
(INCLUDING TAX)

PLEASE SIGN IN THE BOX
AS YOU HAVE SIGNED ON
YOUR CARD.

CREDIT

DEBIT

CASH

FIG. 4C

TOTAL PURCHASE PRICE 128,000 YEN
(INCLUDING TAX)

PLEASE SIGN IN THE BOX
AS YOU HAVE SIGNED
ON YOUR CARD.

STORE

FIG. 4D

TOTAL PURCHASE PRICE 128,000 YEN
(INCLUDING TAX)

PLEASE SIGN IN THE BOX
AS YOU HAVE SIGNED
ON YOUR CARD.

FUJITSU TARO

STORE

FIG. 5

FUJITSU
VARIETY STORE

<DETAILS OF PURCHASE>

SEPTEMBER 13, 2001. 12:00
SEIAL NUMBER: 0001 0101

1234 LIQUID CRYSTAL TELEVISION
      120,000    1    120,000
1235 LIQUID CRYSTAL TELEVISION ADAPTER
      8,000    1    8,000

SUBTOTAL    128,000
(INCLUDING TAX)

TOTAL    128,000
CREDIT
PAYMENT    128,000

RECEIPT 1234567890
CREDIT SIGNATURE

| FUJITSU TARO |

OPERATOR: FUJITSU HANAKO

THANK YOU.

TRANSACTION TERMINAL APPARATUS

BACKGROUND OF THE INVENTION

1. Field of the Invention

The present invention relates to a transaction terminal apparatus that executes transactions with customers, and more particularly to a transaction terminal apparatus that uses a transaction medium such as a credit card on which information for settlement is stored to process a settlement that requires a customer's signature.

2. Description of the Related Art

When settling a purchase of a product at a retail shop such as a variety store or in a shopping centre by credit card, the sales outlet does not always have a credit card settlement terminal. Here, the shop assistant takes a credit card from the customer as well as the product being purchased and the settlement is processed in a place away from the sales outlet and the customer therein.

The transaction with the customer is processed, for example, according to the following procedure.

(1) The customer indicates to the shop assistant that they want to purchase a product.
(2) The shop assistant takes a credit card from the customer.
(3) The shop assistant takes the product and the credit card away from the sales outlet and moves to a credit card settlement terminal located somewhere such as a cashier counter.
(4) The information on the card is read by the settlement terminal and the purchase price calculated.
(5) The settlement terminal communicates with the server at the credit company and confirms that credit is available.
(6) After confirmation of credit, a receipt is printed by the settlement terminal.
(7) The shop assistant then returns to the sales outlet with the receipt, the product, and the credit card, and asks the customer to sign the receipt.
(8) The shop assistant checks the signature on the receipt against the signature on the credit card then returns the credit card to the customer and hands over the product.

During the period between (3) and (7) of the above procedure, the customer may feel unease when the shop assistant takes charge of the credit card, in particular, if they leave to go to a place that cannot be seen by the customer.

In recent years, use of transaction terminal apparatus with a settlement function has become widespread. Transaction terminal apparatus with a settlement function (hereinafter referred to simply as a transaction terminal) is, for example, a mobile terminal. In addition to prescribed entry and display units, it is equipped with a card reader for reading card information from a credit card and with a function for communicating with the server of the credit company to confirm credit availability. Such a transaction terminal being available to shop assistants in a sales outlet enables card information to be read and settlement processing, which includes credit confirmation, to be implemented within the sales outlet.

However, even when such a transaction terminal is used, a customer can, as before, still feel unease during the relatively long period between when the shop assistant takes the credit card from the customer to when the card information has been read, credit confirmed, a receipt printed (when the transaction terminal has an inbuilt printer), and the receipt signed, because the shop assistant retains the card for this length of time.

SUMMARY OF THE INVENTION

An object of the present invention is to provide a transaction terminal apparatus that executes a transaction wherein the transaction medium (such as a credit card) can be returned to a customer as quickly as possible after it has been taken by the shop assistant from the customer.

To achieve the above object, the present invention is provided with an entering (entry) unit (device) for entering a customer's signature on the display unit of the transaction terminal apparatus for executing a transaction with a client. The entered signature is then displayed on the display unit. By having the customer thus sign on the display unit after the shop assistant has taken a transaction medium (such as a credit card) from the customer and had the card information (information for settlement, including card number) read, the shop assistant can quickly match the signatures and then return the transaction medium to the customer. This enables the unease felt by a customer when a shop assistant has taken charge of a transaction medium for a relatively long time to be eliminated.

For example, a mobile terminal according to the present invention that uses a transaction medium on which information for settlement is recorded to execute settlement processing that requires the customer's signature comprises: an acquisition unit for acquiring information recorded on the above transaction medium; a control unit that proceeds with the above settlement processing based on the information acquired as above and that requests the customer's signature at a prescribed stage in the above settlement processing; an entering unit for entering a signature; and a display unit for displaying the signature entered from the entering unit.

The aforementioned entering unit is, for example, a touch panel that detects a touch given to the display unit.

BRIEF DESCRIPTION OF THE DRAWINGS

FIGS. 4A, 4B, 4C and 4D show examples of screens displayed on display unit 10 as settlement processing proceeds in the transaction terminal apparatus according to an aspect of the embodiment of the present invention; and FIG. 5 shows an example of a receipt upon which a signature is printed.

DESCRIPTION OF THE PREFERRED EMBODIMENTS

An aspect of the embodiment of the present invention is explained below. However, the technical scope of the present invention is not limited to this aspect of the embodiment.

Figure 1:
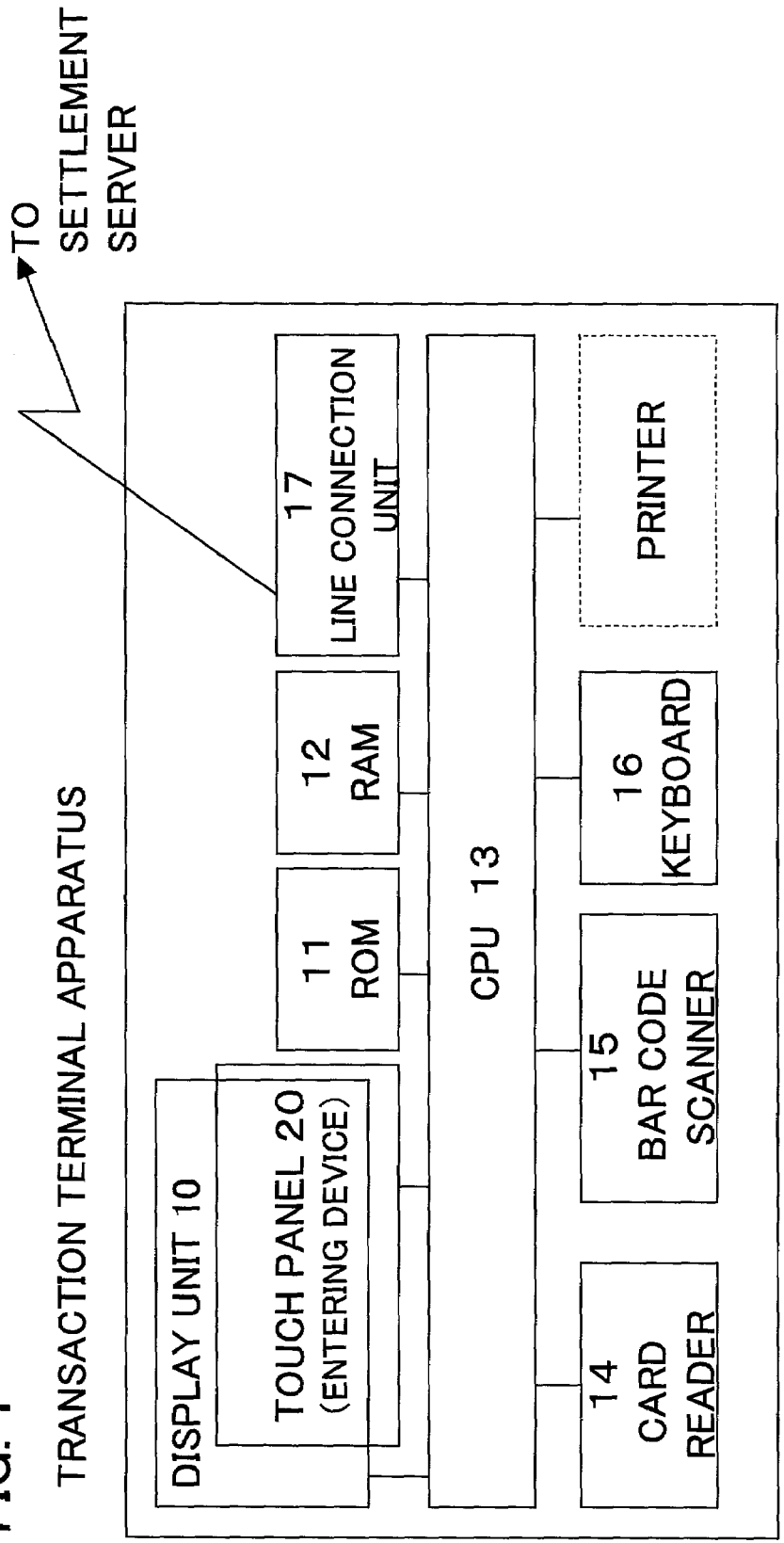
FIG. 1 is a block diagram of a transaction terminal apparatus according to an aspect of the embodiment of the present invention.
Figure 2:
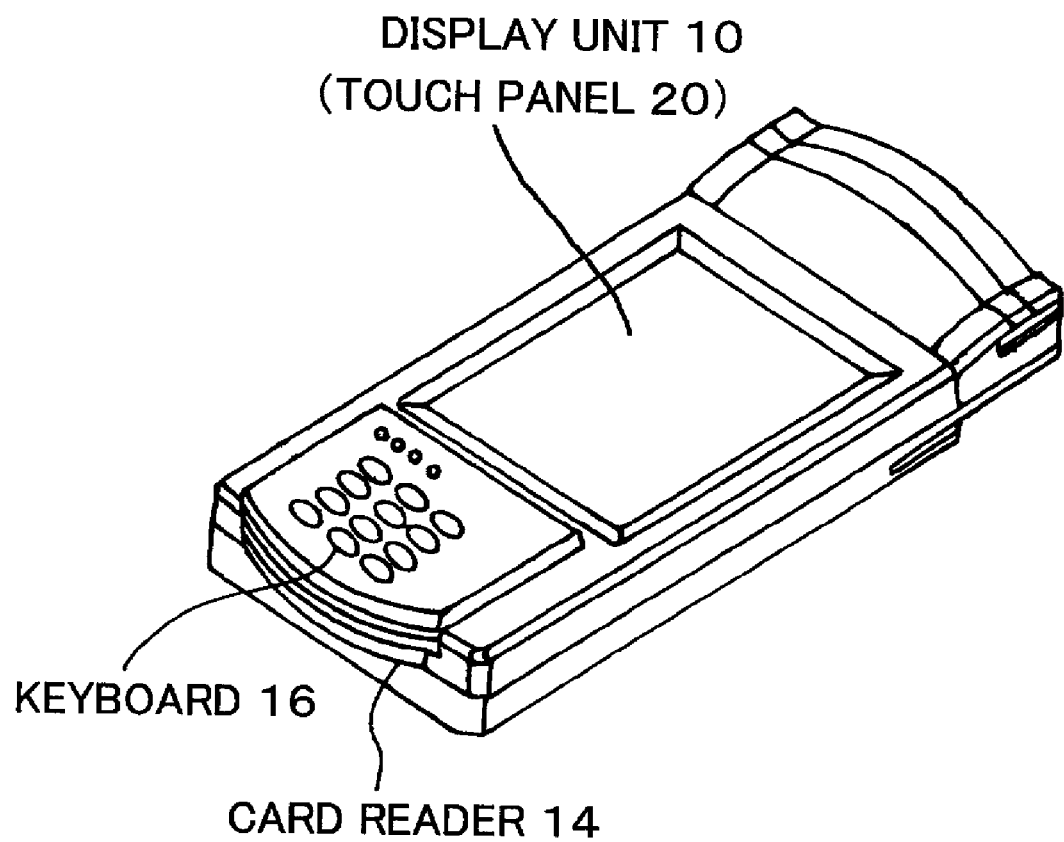
FIG. 2 shows an example of the external configuration of a transaction terminal apparatus according to an aspect of the embodiment of the present invention.

FIG. 1 is a block diagram of a transaction terminal apparatus according to an aspect of the embodiment of the present invention. FIG. 2 shows the external configuration of a transaction terminal apparatus. As shown in FIG. 2, the transaction terminal apparatus is, for example, a mobile terminal. In FIG. 1, the transaction terminal apparatus comprises: a display unit 10 using, for example, liquid crystals;

ROM 11 that stores various programs for executing various transactions such as settlements; RAM 12 that stores temporary data; a CPU 13 that executes transaction programs; a card reader 14 that reads a customer's personal information (card information) that is recorded on the transaction medium, for example a credit card or cash card; a bar code scanner 15 that reads the bar code of a product; a keyboard 16; and a line connection unit 17 that communicates with a prescribed settlement server via communication lines.

According to this aspect of the embodiment, in the transaction terminal apparatus of the above configuration, the display unit 10 is equipped with an entering device 20 such as a touch panel. A signature written by the customer on the touch panel is displayed on display unit 10.

The touch panel generally comprises an entering device such as a tablet or digitiser. By locating it above or below the screen on the display unit 10, comprising a liquid crystal display for example, the position on which a pointing device such as a touch pen comes into contact with the screen can be detected. More specifically, a pressure sensitive tablet is a resistance film comprising a transparent electrode and it is affixed onto the surface of the screen. The contact position of the touch pen is detected through the measurement of the electric potential split by resistance caused by touch pen contact. Alternatively, an electromagnetic tablet can be positioned under the screen and the position of contact detected through detection of the magnetism generated from the point of the pen. Various methods of detecting the contact position can be used. In addition to a pressure sensitive tablet and an electromagnetic table, these include methods that utilise ultrasonic waves such as ultrasonic surface acoustic wave touch panels.

Figure 3:
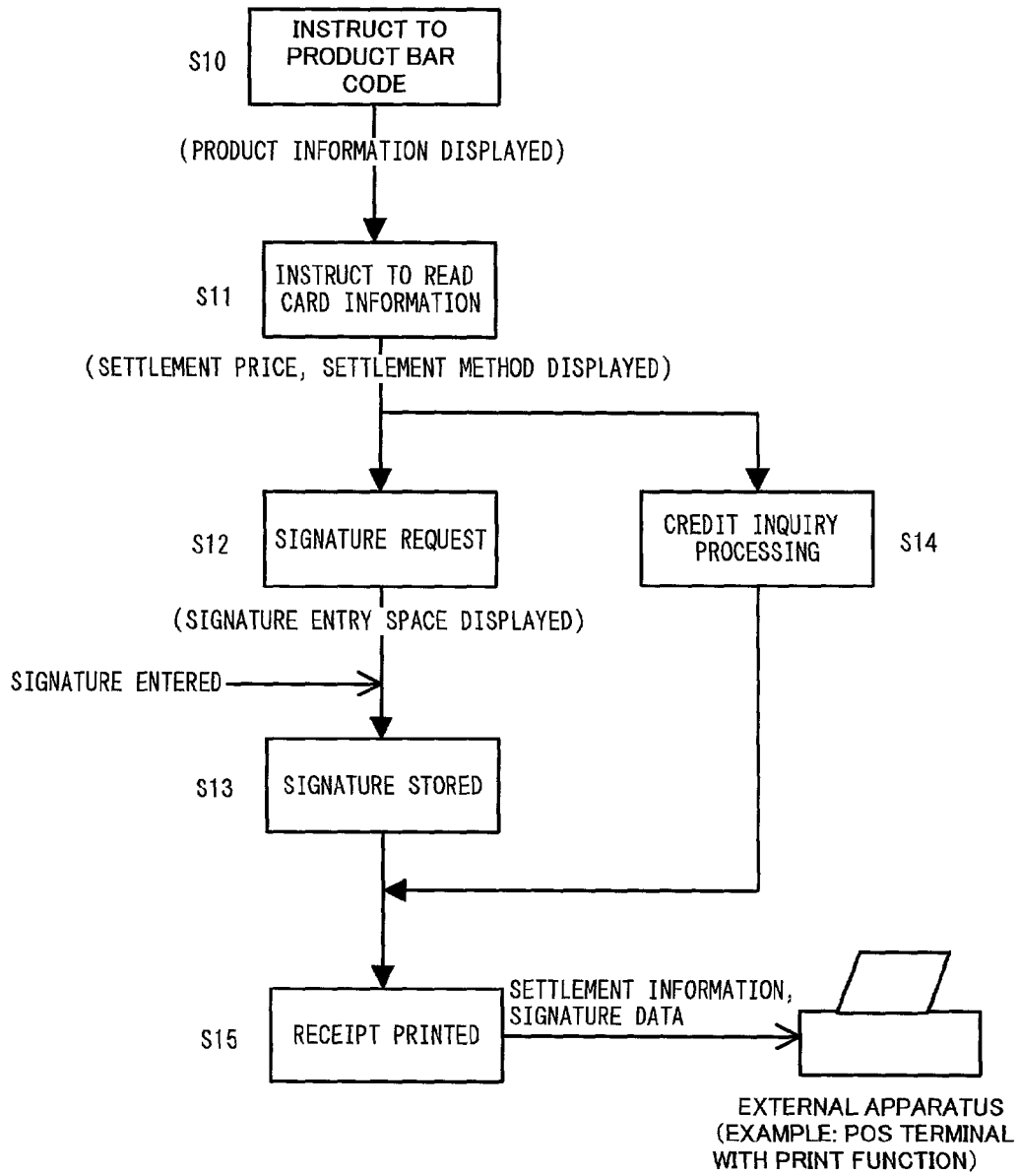
FIG. 3 is a flowchart of settlement processing in a transaction terminal apparatus according to an aspect of the embodiment of the present invention.

The procedure used in settlement processing when a product is to be purchased using the transaction terminal apparatus according to this aspect of the embodiment will be explained using FIG. 3 and FIGS. 4A, 4B, 4C and 4D for reference. FIG. 3 is a flowchart of settlement processing in the transaction terminal apparatus of this aspect of the embodiment. FIGS. 4A, 4B, 4C and 4D shows examples of screens displayed on display unit 10 as settlement processing progresses.

In FIG. 3, the transaction terminal instructs reading of the bar code on the product that a customer wishes to purchase (S10). FIG. 4A is an example of a screen that instructs reading of a product. The shop assistant uses the bar code scanner 15 on the transaction terminal to read (scan) the bar code attached to the product being purchased by the customer. The transaction terminal then uses its POS function to access the prescribed product server via the line connection unit 17. It acquires the name and price (product information) of the product being purchased that corresponds to the read bar code. As shown in FIG. 4(a), this is displayed on the display unit 10.

Next, the transaction terminal instructs reading of the card information (personal customer information including the card number) to be used in the settlement (S11). FIG. 4B is an example of the screen that instructs reading of card information. When the bar code of the product being purchased has been read, the shop assistant presses the "total" unit on FIG. 4B with a finger or touch pen. This causes display of the screen that instructs reading of card information, as shown in FIG. 4B. In the screen of FIG. 4B, the settlement price (total price) and settlement method is displayed. While the transaction terminal apparatus according to this aspect of the embodiment also allows selection of a cash settlement or settlement using a debit card that requires no signature, such as a cash card, the following explanation relates to selection of settlement by credit card.

The shop assistant takes the credit card from the customer and reads the card information using card reader 14.

After the card information is acquired, the transaction terminal requests that a signature be made on the display unit 10 (S12). This is the settlement processing procedure characteristic of this aspect of the embodiment. FIG. 4C is an example of a signature request screen. The shop assistant asks the customer to sign in signature column 10a displayed on the display unit 10. The customer then uses a touch pen, for example, to sign. FIG. 4D is an example of a screen on which a signature has been written.

The shop assistant then compares the signature on the credit card they have taken charge of and the signature entered on the display unit 10, confirms that they match, and then returns the credit card to the customer. When the "store" unit on FIG. 4D is pressed, the transaction terminal stores the signature entered in signature column 10a as image data (S13).

Thus, in this aspect of the embodiment, after the shop assistant has taken a credit card from the customer and the card information has been read, the next procedure is to have the customer sign on the display unit 10 and, immediately after comparing the signatures, return the credit card to the customer. Accordingly, compared to conventional methods in which the signatures are compared on the receipt printed at the end of the transaction, the time during which the shop assistant has charge of the customer's credit card is greatly reduced. Thus, the client has virtually no feeling of unease.

After the card information has been acquired in step S11, the transaction terminal displays the signature request screen of FIG. 4C on the display unit 10 and, at the same time, implements a credit inquiry (S14). That is, the transaction terminal sends settlement information, including at least the total purchase price information and card information, via communication lines from the line connection unit 16 to the settlement server of the prescribed credit card company. The settlement server determines whether or not settlement is allowed based on the settlement information and returns the results (settlement allowed/not allowed) to the transaction terminal.

Thus, in this aspect of the embodiment, a customer's signature is given as the credit inquiry based on settlement information is being made and so, compared with conventional methods in which a signature is required on a receipt that is printed after the credit inquiry, transaction time is reduced and the time during which a customer must wait is shortened. Therefore, customer service is improved.

An example of a signature request being made at the same time as credit confirmation is processed has been explained above, but of course, the credit confirmation can be processed after the signatures have been compared. That is, the credit inquiry can be made after the shop assistant has compared the signature on the credit card they have taken from the customer with the signature entered on display unit 10 and confirmed that they match. Specifically, after the customer has written their signature, the shop assistant saves the signature image by pressing the "store" unit on FIG. 4D and, at the same time, settlement information is sent to the settlement server.

When settlement permission information is received from the settlement server, the transaction terminal executes processing to print a receipt (S15). Specifically, when the transaction terminal does not have a print function, it is connected to an external apparatus (for example a POS terminal or external printer) with a print function. For example, the transaction terminal can be connected to a POS terminal with an inbuilt printer located on the cashier counter. Alternatively, a small printer can be connected to the transaction terminal. The transaction terminal sends the aforementioned settlement information that it has stored internally and the signature image data to the external apparatus. When the external apparatus receives the settlement information and signature image data, it executes the prescribed processing and generates receipt data including the signature image data. A receipt on which the signature is printed is then printed out. Editing can also be executed by the transaction terminal.

FIG. 5 shows an example of a receipt on which a signature is printed. As shown in FIG. 5, the signature image data stored in Step S14 is printed in the signature column on the receipt. The transaction ends when the shop assistant hands the product and the printed receipt to the customer.

When the receipt is printed on a POS terminal located at a cashier counter away from the sales outlet, the shop assistant must temporarily go away from the sales outlet where the customer waits. However, unlike in a conventional settlement procedure, matching of the signature has already ended and the customer has had their credit card returned to them. Therefore, they have no feeling of unease.

Alternatively, when the transaction terminal has a print function (transaction terminal has an inbuilt printer), the transaction terminal itself can print out the receipt on which the signature is printed.

In this aspect of the embodiment, the customer does not sign on a paper receipt and the transaction terminal can store the customer's signature as image data. Accordingly, a shop does not need to store the signature in their transaction records on paper generated as a copy of the receipt handed over to the customer in conventional processing. The signature can be stored as data and so the costs involved in storage on paper are reduced.

In the above aspect of the embodiment, settlement processing involving a credit card in which a signature is required has been explained. However, the transaction terminal apparatus according to the present invention can also be applied in settlement processing using transaction media (not necessarily limited to cards) other than credit cards. Application of this transaction terminal is also not limited to settlement processing of product purchase transactions but can also be applied in processing settlement of transactions that require other signatures.

According to the present invention as described above, the display unit of the transaction terminal that executes a transaction with a client is equipped with an entering device on which a customer's signature is entered so it can then be displayed on the display unit. This means that a shop assistant, after taking charge of a transaction medium (credit card, for example) from the customer and reading the card information, is able to have the customer sign on the display unit and then compare the signatures. The shop assistant can then quickly return the transaction medium to the customer, thereby eliminating any feeling of unease that a customer may experience when their transaction medium is taken for a relatively long period of time.

The scope of the present invention is not limited to the above aspect of the embodiment but extends to include the invention as described in the claims and all equivalents.

What is claimed is:

1. A transaction terminal apparatus for executing settlement processing that requires a customer's operation for authorizing a customer, using a transaction medium that stores information for settlement, comprising:
    an acquisition unit acquiring said information from said transaction medium;
    a control unit proceeding with said settlement processing based on acquired said information and for requesting an operation for entering a signature of a customer for authorizing said customer from said customer at a prescribed stage in said settlement processing, said control unit requesting and receiving said operation for entering said signature of said customer for authorizing said customer, entered by said customer at a time before the settlement processing ends and implementing a credit inquiry upon displaying an operation for authorizing a customer request screen;
    an entering unit entering said signature of said customer by said customer; and
    a display unit for displaying the operation for authorizing the customer entered from said entering unit, wherein:
    said settlement processing includes communicating with a settlement server via a network and receiving a result of a determination whether or not settlement is allowed, from the settlement server.

2. The transaction terminal apparatus according to claim 1, wherein:
    said entering unit is a touch panel detecting a touch given to said display unit; and
    said display unit displays an operation for authorizing a customer entry space at said prescribed stage and displays an operation for authorizing a customer entered by a touch given to the operation for authorizing a customer entry space.

3. The transaction terminal apparatus according to claim 1, further comprising a storage unit for storing said entered operation for authorizing a customer as image data.

4. The transaction terminal apparatus according to claim 3, further comprising a printing unit for printing a receipt including said entered operation for authorizing a customer at a receipt printing stage later than said prescribed stage in said settlement processing.

5. The transaction terminal apparatus according to claim 3, wherein image data of said entered operation for authorizing a customer is output to an external apparatus that has a print function so that said entered operation for authorizing a customer is printed on a receipt printed by said external device, at a receipt printing stage later than said prescribed stage in said settlement processing.

6. An external apparatus that prints a receipt on which said entered operation for authorizing a customer image data, output from the transaction terminal apparatus according to claim 5, is printed.

7. A method for executing settlement processing, comprising:
    requesting and receiving a signature entered by a customer at a time before the settlement processing ends;
    implementing a credit inquiry upon displaying a signature request screen; and
    conducting the settlement processing in accordance with results of the credit inquiry.

* * * * *